US009855808B2

(12) United States Patent
Suzumori

(10) Patent No.: US 9,855,808 B2
(45) Date of Patent: Jan. 2, 2018

(54) SUSPENSION ARM AND METHOD OF PRODUCING THE SAME

(71) Applicant: TOYODA IRON WORKS CO., LTD., Toyota-shi, Aichi (JP)

(72) Inventor: Michio Suzumori, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 129 days.

(21) Appl. No.: 14/900,461

(22) PCT Filed: Oct. 31, 2013

(86) PCT No.: PCT/JP2013/079637
§ 371 (c)(1),
(2) Date: Dec. 21, 2015

(87) PCT Pub. No.: WO2014/203420
PCT Pub. Date: Dec. 24, 2014

(65) Prior Publication Data
US 2016/0152105 A1 Jun. 2, 2016

(30) Foreign Application Priority Data

Jun. 19, 2013 (JP) .................. 2013-128947

(51) Int. Cl.
*B60G 7/00* (2006.01)
*B23K 33/00* (2006.01)
(Continued)

(52) U.S. Cl.
CPC ............. *B60G 7/001* (2013.01); *B23K 31/02* (2013.01); *B23K 33/008* (2013.01);
(Continued)

(58) Field of Classification Search
CPC . B60G 7/00; B60G 9/02; B60G 7/001; B60G 2206/10; B60G 2206/8201;
(Continued)

(56) References Cited

U.S. PATENT DOCUMENTS 1,846,567 A * 2/1932 Murray, Jr. ............ B62D 21/02
                                                      182/228.1
4,202,484 A * 5/1980 Peterson .................. B29K 9/00
                                                      228/173.2
(Continued)

FOREIGN PATENT DOCUMENTS

JP          H09-193634 A         7/1997
JP          H09-511968 A        12/1997
(Continued)

OTHER PUBLICATIONS

Sakuma et al. JP 2010 274823 English translation ip.com.*
(Continued)

*Primary Examiner* — Karen Beck
(74) *Attorney, Agent, or Firm* — Oliff PLC

(57) ABSTRACT

A suspension arm includes a suspension arm body having a tubular joint portion defining an opening in an end surface, and a bushing receiving sleeve integrally welded to the end surface of the tubular joint portion to seal the opening in the end surface. The end surface is curved to have a circular arc profile complementary to the cylindrical outer surface of the bushing receiving sleeve so that when butted against the cylindrical outer surface the end surface is in contact with the cylindrical outer surface on its entire periphery. The end surface is butted against the cylindrical outer surface in the entire periphery and then welded along the entire periphery to the cylindrical outer surface.

4 Claims, 6 Drawing Sheets

(51) Int. Cl.
*B23K 31/02* (2006.01)
*B23K 101/00* (2006.01)

(52) U.S. Cl.
CPC .. *B23K 2201/006* (2013.01); *B60G 2206/012* (2013.01); *B60G 2206/017* (2013.01); *B60G 2206/10* (2013.01); *B60G 2206/11* (2013.01); *B60G 2206/14* (2013.01); *B60G 2206/8201* (2013.01)

(58) Field of Classification Search
CPC .......... B60G 2206/11; B60G 2206/017; B60G 2206/012; B60G 2206/14; B23K 31/02; B23K 33/008; B23K 2201/006; B62D 51/26
USPC ...................................................... 29/402.07
See application file for complete search history.

(56) References Cited

U.S. PATENT DOCUMENTS

| | | | | |
|---|---|---|---|---|
| 5,639,110 A * | 6/1997 | Pierce | ................... | B60G 7/001 280/124.11 |
| 6,062,762 A * | 5/2000 | Lustig | ..................... | B60G 7/00 228/171 |
| 6,250,657 B1 * | 6/2001 | Valin | ..................... | B21D 53/88 228/173.4 |
| 8,220,811 B2 * | 7/2012 | Shimada | .................. | B21D 7/08 280/124.134 |
| 8,490,989 B2 * | 7/2013 | Piehl | ....................... | B60G 9/02 280/124.11 |
| 2014/0151440 A1 * | 6/2014 | Larikka | ................. | F16L 41/084 228/171 |
| 2014/0270919 A1 * | 9/2014 | Kokinakis | ............. | B23K 31/02 403/231 |

FOREIGN PATENT DOCUMENTS

| | | | |
|---|---|---|---|
| JP | 2002-337525 A | | 11/2002 |
| JP | 2010-274823 A | | 12/2010 |
| JP | 2010274823 A | * | 12/2010 |
| JP | 2016124400 A | * | 7/2016 |

OTHER PUBLICATIONS

Jan. 20, 2017 Search Report issued in European Patent Application No. 13887304.7.
Nov. 1, 2016 Office Action issued in Chinese Patent Application No. 201380077655.2.
Dec. 8, 2015 Office Action issued in Japanese Patent Application No. 2013-128947.
Jan. 21, 2014 International Search Report issued in International Patent Application No. PCT/JP2013/079637.
Apr. 27, 2015 International Preliminary Report on Patentability issued in International Patent Application No. PCT/JP2013/079637.

* cited by examiner

SUSPENSION ARM AND METHOD OF PRODUCING THE SAME

FIELD OF THE INVENTION

The present invention relates to a suspension arm and particularly to a suspension arm with a bushing receiving sleeve integrally welded to the opening in the end surface of the tubular joint portion of the suspension arm body so that the opening is sealed by the sleeve.

RELATED ART

A suspension arm with bushing receiving sleeves integrally joined by welding to the suspension arm body is widely used as a component of the suspension system of a vehicle. Patent Publication 1 discloses an example of such a suspension arm, in which a bushing receiving sleeve is welded integrally to the tubular joint portion of the suspension arm body, and the joint portion of the bushing receiving sleeve includes a ridge to seal the opening of the tubular joint portion of the suspension arm body. This closing of the opening in the tubular joint portion by the bushing receiving sleeve prevents water and/or mud from entering the suspension arm body which would result in rust.

PRIOR ART DOCUMENTS

Patent Publications

Patent Publication 1: Japanese Patent Publication No. 2010-274823

SUMMARY OF THE INVENTION

However, the blocking of the opening of the tubular joint portion by such a ridge formed in the bushing receiving sleeve may lead to a higher manufacturing cost for the extra process of forming the ridge as compared with the case of simply using a round pipe material for the sleeve. The manufacturing cost is further increased due to the need to control dimensional accuracy of both ridge and tubular joint so that the ridge can engage with the tubular joint, and to weld them so as to trace the form of the ridge.

There is a need for reducing the cost in manufacturing a suspension arm with a bushing receiving sleeve welded to the end surface of the tubular joint portion of the suspension arm body to seal the opening in the end surface of the tubular joint portion.

The invention provides in a first aspect a suspension arm comprising a suspension arm body having a tubular joint portion defining an opening in a end surface, and a bushing receiving sleeve integrally welded to the end surface of the tubular joint portion to seal the opening in the end surface, characterized in that (a) the end surface is curved to have a circular arc profile complementary to the cylindrical outer surface of the bushing receiving sleeve so that when butted against the cylindrical outer surface the end surface is in contact with the cylindrical outer surface on its entire periphery, (b) the end surface is butted against the cylindrical outer surface in the entire periphery and then welded along the entire periphery to the cylindrical outer surface.

In a second aspect the invention provides a method for producing a suspension arm, comprising welding a bushing receiving sleeve integrally to the end surface of a tubular joint portion of the suspension arm body to seal an opening defined in the end surface by the tubular joint portion, characterized in that (a) the end surface is curved to have a circular arc profile complementary to the cylindrical outer surface of the bushing receiving sleeve so that when butted against the cylindrical outer surface the end surface is in contact with the cylindrical outer surface on its entire periphery, (b) the end surface is butted against the cylindrical outer surface in the entire periphery and then welded along the entire periphery to the cylindrical outer surface.

In a third aspect the invention provides a method of producing a suspension arm according to the second aspect, characterized in that (a) the tubular joint portion comprises an arc-end-side wall at an end of the circular arc profile of the end surface, the arc-end-side wall being in contact with the cylindrical outer surface at least on the inner peripheral edge of the opening, (b) the arc-end-side wall comprises a terminal face with a width equal to or less than the thickness of the arc-end-side wall, the terminal face being more spaced from the cylindrical outer surface as it approaches the outer edge, defining a V-shaped groove between the terminal face and the cylindrical outer surface, and (c) the arc-end-side wall defining the groove is welded through the groove so that heat reaches the bottom of groove.

In a fourth aspect the invention provides a method of producing a suspension arm according to the third aspect, characterized in that (a) the groove has an opening angle θ of 30° or more, and (b) the terminal face of the arc-end-side wall extends from the outer edge of the arc-end-side wall, with a width of the terminal face, as measured perpendicularly to the axis of the tubular joint portion, within a range from half to whole the thickness t of the arc-end-side wall.

In suspension arms according to the first aspect, the end surface of the tubular joint portion is curved to have a circular arc profile complementary to the cylindrical outer surface of the bushing receiving sleeve. The end surface of the tubular joint portion in its entire periphery is in contact with the cylindrical outer surface, and welded along its entire periphery to the cylindrical outer surface. This allows the bushing receiving sleeve to adequately seal the opening in the end surface of the tubular joint portion, thereby assuredly preventing water and/or mud from intrusion into the suspension arm body. Further, a round tube material may be directly used as the bushing receiving sleeve. The end surface of the tubular joint portion is only required to have a circular arc profile without any special dimensional accuracy control. The welding process only need to trace the cylindrical outer surface of the bushing receiving sleeve. The manufacturing cost is thus reduced compared with the case of forming a ridge in the bushing receiving sleeve as described in Patent Publication 1.

The producing method of the second aspect provides substantially the same effects as the first aspect. In the method of the third aspect, the arc-end-side wall at an end of the circular arc profile of the end surface of the tubular joint portion is in contact with the cylindrical outer surface, on at least the inner peripheral edge of the opening. The terminal face of the arc-end-side wall and the cylindrical outer surface of the bushing receiving sleeve defines the V-shaped groove, and the welding occurs through the groove so that heat reaches the bottom of the groove. This allows for a well-distributed heat input through the groove over the tubular joint portion and the bushing receiving sleeve, leading to a higher bonding strength at its arc-end-side wall due to the larger penetration depth d and leg length L of the weld in the bushing receiving sleeve, while ensuring that the opening of the end surface of the tubular joint portion is sealed by the bushing receiving sleeve.

In the method of the fourth aspect, the groove has an opening angle θ of 30° or more so that in the process of welding the heat is easily distributed through the groove over the tubular joint portion and bushing receiving sleeve. Further, the arc-end-side wall includes a terminal face defining a groove, the terminal face extending from the outer edge of the arc-end-side wall, with a width of the terminal face, as measured in the plane perpendicular to the axis of the tubular joint portion, within a range from half to whole the thickness t of the arc-end-side wall. This allows the groove to be large enough to enhance the bonding strength of the joint while ensuring that the opening in the end surface of the tubular joint portion is sealed by the bushing receiving sleeve. If the terminal face of the arc-end-side wall is wider than the thickness t, a gap would occur between the opening of the end surface of the tubular joint portion and the cylindrical outer surface of the bushing receiving sleeve, leading to a potential of water intrusion depending on the welding conditions. On the other hand, when the terminal face of the arc-end-side wall is thinner than half the thickness t, the groove would be smaller and thus not sufficiently produce the strengthening effect from the improved heat distribution.

DETAILED DESCRIPTION OF THE INVENTION

Figure 1:
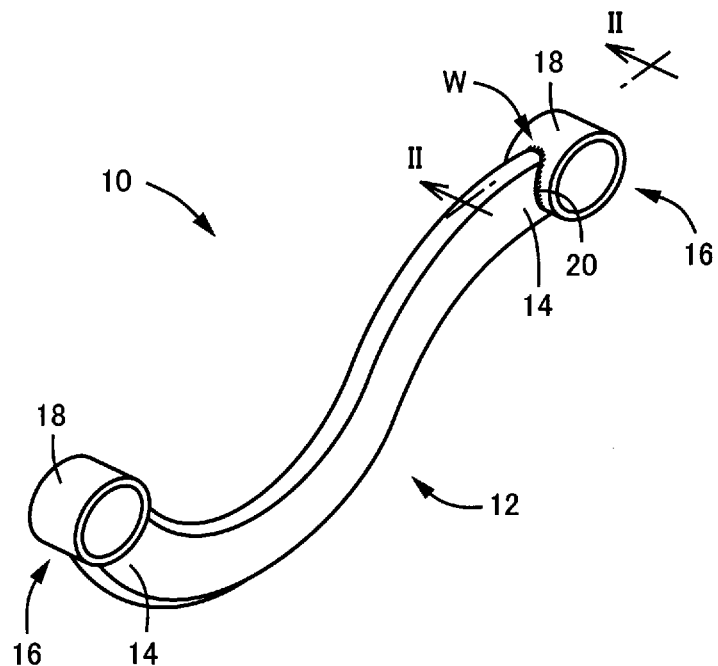
FIG. 1 is a perspective view showing a type of a vehicle suspension arm to which the present invention is suitably applied.

The suspension arm body may be, for example, hollow and long, with both ends of the length serving as the tubular joint portions, but may also be bifurcation or any other various geometries that include at least one tubular joint portion to which a bushing receiving sleeve is welded. The bushing receiving sleeve may receive, for example, an inner sleeve inserted with an intermediate elastic member. Through this inner sleeve the suspension arm is mounted into a vehicle. A round tube is preferably used for the bushing receiving sleeve. The end surface of the tubular joint portion is curved to have a circular arc profile complementary to the cylindrical outer surface for engaging with the cylindrical outer surface of the bushing receiving sleeve over its entire periphery. The end surface may be configured such that, for example, at least the inner peripheral edge of the opening in the end surface is in contact with the cylindrical outer surface on the entire periphery. Alternatively, the end surface may be configured such that only some part of the end surface is in contact with the cylindrical outer surface on the entire periphery. The end surface is not required to be in a perfect contact with the cylindrical outer surface on its entire periphery; there may be partly a slight gap (e.g., less than about 1 mm) due to some machining error.

The terminal face of the arc-end-side wall that defines a V-shaped groove with the cylindrical outer surface of the bushing receiving sleeve may preferably comprise, for example, a planar surface perpendicular to the axis of the tubular joint portion of the suspension arm body, but may be a planar surface inclined from the perpendicular plane to the axis toward either the same side as the bushing receiving sleeve or the opposite side. The opening angle θ of the groove is preferably at least 30°, and desirably more than 45°. However, angles less than 30° can also provide an improved heat distribution and thus an enhanced bonding strength. The terminal face of the arc-end-side wall may preferably extend from the outer edge of the arc-end-side wall and have a width within a range of half to whole the thickness t of the arc-end-side wall, as measured perpendicularly to the axis of the tubular joint portion. However, a width narrower than half the thickness t can also provide an improved heat distribution through the groove to enhance the bonding strength. For implementation of the first or second aspect of the invention, the V-shaped groove is not necessary, and therefore the entire end surface of the tubular joint portion, inclusive of the arc-end-side wall, may be curved to have a circular arc profile complementary to the cylindrical outer surface, such that the entire end surface, inclusive of the terminal face of the arc-end-side wall, is in a substantially close contact with the cylindrical outer surface.

The tubular joint portion of the suspension arm body may have, for example, a hollow, elongate (such as obround or rectangular) cross section perpendicular to the axis of the tubular joint portion. The end surface may be curved along the major axis of such an elongate cross section to have a circular arc profile complementary to the cylindrical outer surface of the bushing receiving sleeve so that the tubular joint portion can be butted against the cylindrical outer surface such that the major axis of the elongate cross section is oriented substantially at a right angle to the central axis of the bushing receiving sleeve. Alternatively, the end surface may be curved along the minor axis, which is perpendicular to the major axis, of the elongate hollow cross section to have a circular arc profile complementary to the cylindrical outer surface so that the tubular joint portion can be butted against the bushing receiving sleeve such that the major axis of the elongate cross section is substantially parallel with the central axis of the bushing receiving sleeve. Various other forms of the tubular joint are possible, such as a tubular joint portion with a circular hollow cross section.

Various methods may be used for welding the tubular joint portion and bushing receiving sleeve, such as consumable electrode arc welding, non-consumable electrode arc welding, laser welding, and electron beam welding.

Further embodiments of the present invention will be described below with reference to the accompanying drawings. FIG. 1 is a perspective view of a suspension arm 10 for use in a vehicle suspension system which may be manufactured in a method according to the present invention. The suspension arm 10 include a long tubular body 12 and a pair of bushing receiving sleeves 16 integrally welded to the two respective ends 14 of the length of the suspension arm body 12. Each bushing receiving sleeve 16 may comprise a round pipe, and receives an inner sleeve inserted together with an intermediate elastic member, and is attached to the vehicle through the inner sleeve. The ends 14 of the suspension arm body 12 serve as the tubular joint portions.

Figure 2:
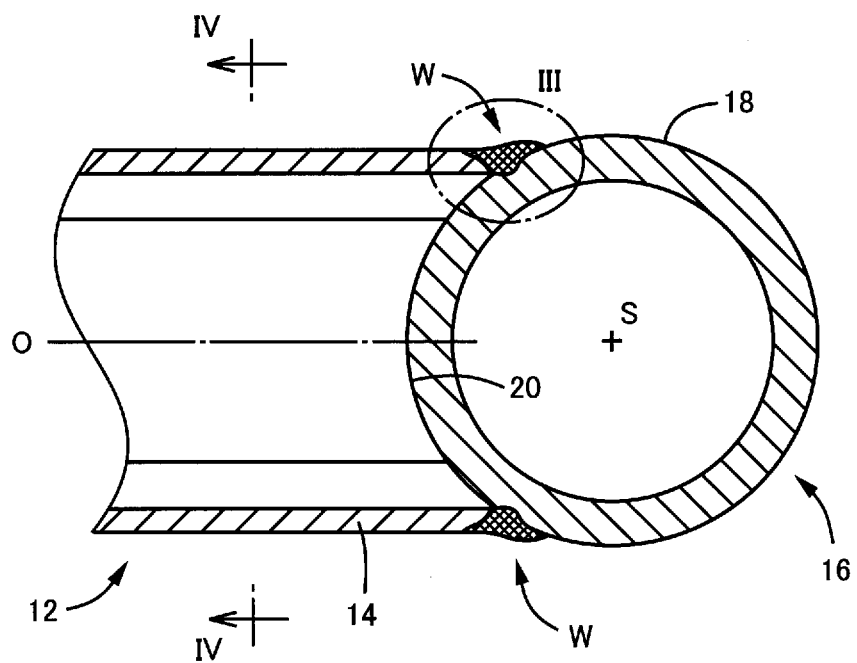
FIG. 2 shows an enlarged section at line II-II indicated in FIG. 1.
Figure 3:
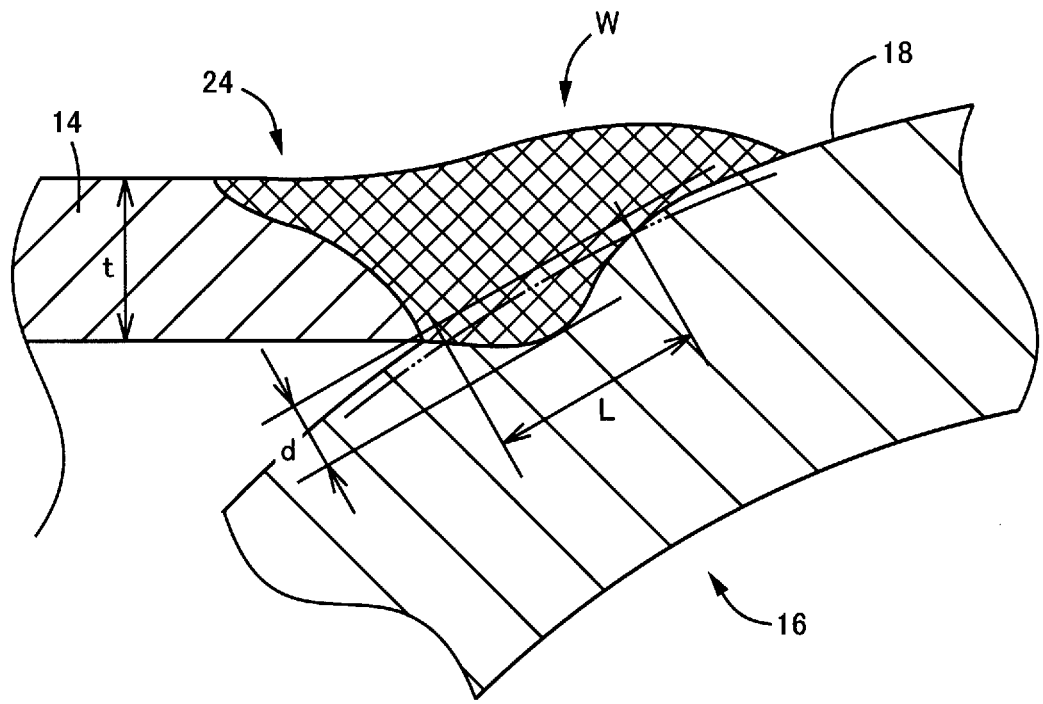
FIG. 3 is a enlarged sectional view of part III indicated in FIG. 2.
Figure 4:
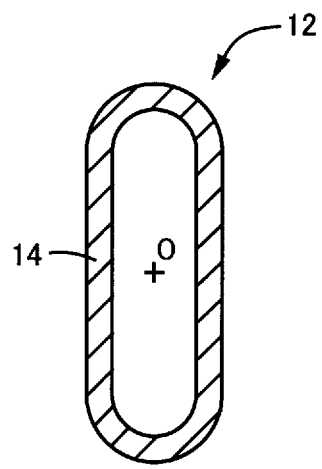
FIG. 4 shows a section at line IV-IV indicated in FIG. 2.

FIG. 2 is an enlarged view of a cross section at II-II as indicated in FIG. 1 with arrows, i.e. a cross section of the joint portion of the suspension arm body 12 and the bushing receiving sleeve 16. FIG. 3 is an enlarged sectional view of part III of FIG. 2, i.e. the weld W (the hatched area). FIG. 4 is a sectional view at IV-IV in FIG. 2, i.e. in a plane perpendicular to the axis O of the end 14. As is clearly seen from these figures, the suspension arm body 12, inclusive of the ends 14 which is a tubular joint portions, may have a hollow obround cross section. Each end 14 is butted against and then integrally joined to the cylindrical outer surface 18 of the bushing receiving sleeve 16 such that the major axis of the obround shape (the vertical axis in FIG. 2) is oriented substantially at a right angle to the central axis S of the bushing receiving sleeve 16, and the axis O of the end 14 is oriented substantially perpendicular to the central axis S. The end surface 20 of the end 14 is curved along the major axis of the obround shape to have a circular arc profile complementary to the cylindrical outer surface 18, and is welded to the cylindrical outer surface 18 along the entire periphery of the obround shape. The end surface 20 of the end 14 of the suspension arm body 12 is thus welded along its entire periphery to the cylindrical outer surface 18, so the opening 21 of the end surface 20 (see FIG. 7) is blocked by the bushing receiving sleeve 16, thereby preventing water and/or mud from intruding through the opening 21 into the suspension arm body 12. While in the shown embodiment the axis O is perpendicular to the central axis S, the end 14 may be butted against and joined to the sleeve such that the axis O intersects the central axis S at an angle to the plane perpendicular to the central axis S. For example, the axis O may be angled to either the far or the near side of the page of FIG. 2. Alternatively, the end may be joined to the sleeve such that the axis O and the central axis S are in skew lines that do not intersect with each other.

Figure 5:
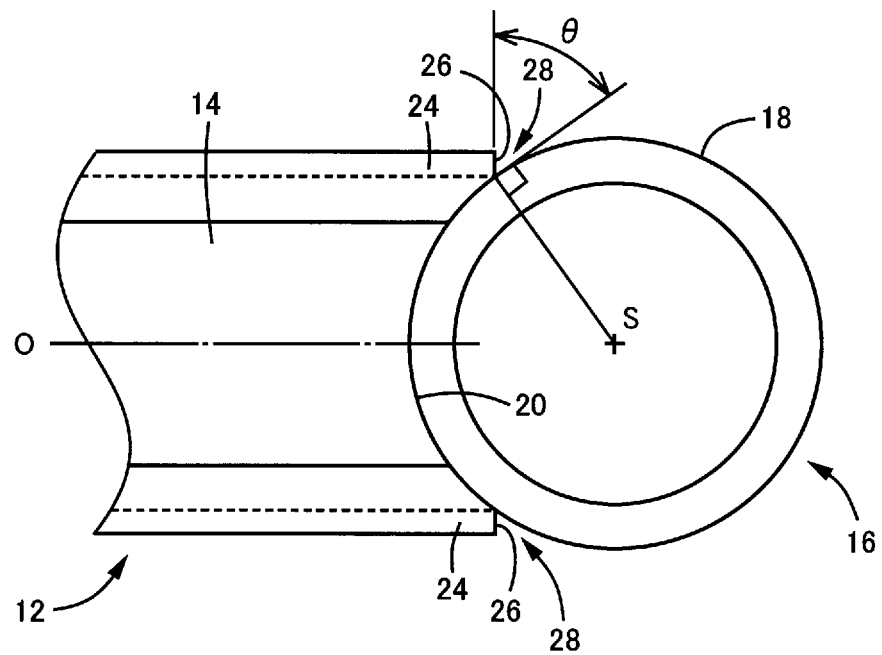
FIG. 5 is a front view of the suspension arm of FIG. 1 prior to the welding, with the end surface of the tubular joint portion of the suspension arm body butted against the bushing receiving sleeve.
Figure 6:
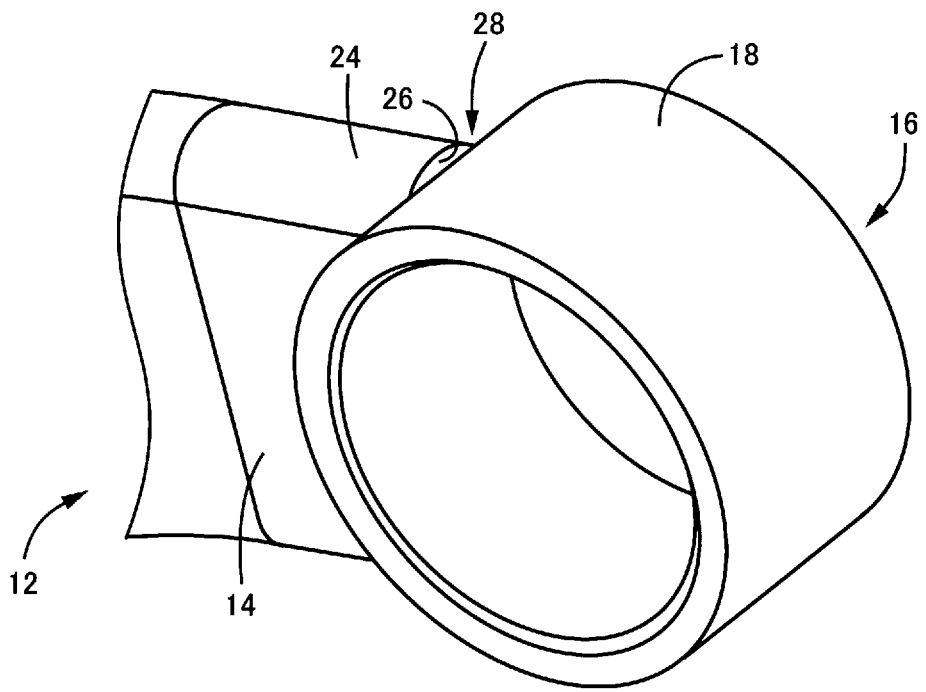
FIG. 6 is a perspective view of the suspension arm body of FIG. 5 butted against the sleeve.
Figure 7:
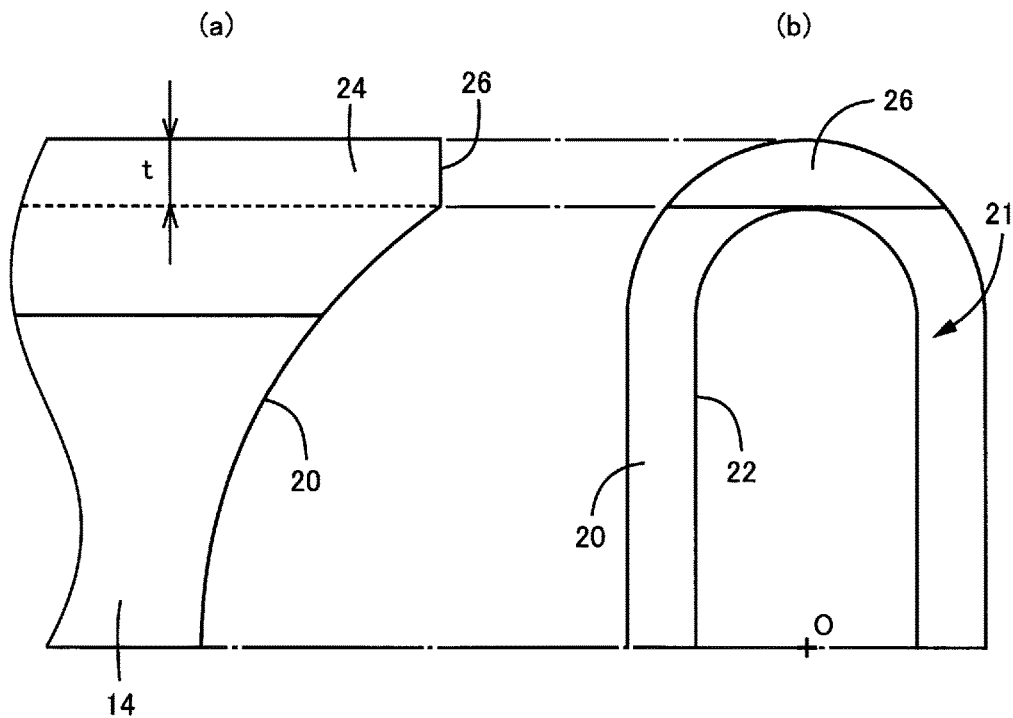
FIG. 7 is an enlarged views of the upper half of the end surface of the tubular joint portion in FIG. 5, in which (a) is a front view comparable to FIG. 5, and (b) is an end view seen toward the end surface.

FIGS. 5 and 6 show the bushing receiving sleeve 16 and the suspension arm body 12 prior to being welded together. FIG. 5 is a front view of the suspension arm body 12 with its ends 14 butted against the bushing receiving sleeves 16, and FIG. 6 is a perspective view of the abutment. FIG. 7 shows an enlarged view of the upper half of the end surface 20 of the end 14 of the suspension arm body 12 shown in FIG. 5, in which (a) is a front view comparable to FIG. 5, and (b) is an end view as seen toward the end surface. As clearly shown in these figures, the end surface 20 of the end 14 is curved to have a circular arc profile, except at the arc-end-side walls 24, that is, the ends of the major axis of the obround opening 21, so that the inner peripheral edge 22 of the obround opening 21 is in contact with the cylindrical outer surface 18 of the bushing receiving sleeve 16 on substantially the entire periphery of the inner peripheral edge 22. Accordingly, the terminal end surface 20 is generally in area contact to the cylindrical outer surface 18, from the inner peripheral edge 22 to the outer peripheral edge, except at the arc-end-side walls 24.

The terminal face 26 of each arc-end-side wall 24 is more spaced from the cylindrical outer surface 18 toward its outer edge (the top and bottom edges as shown in FIG. 5), creating a V-shaped groove 28 between the terminal face 26 and the cylindrical outer surface 18. The terminal face 26 of the arc-end-side wall is a planar surface perpendicular to the axis O of the end 14, and extends from the outer edge of the arc-end-side walls 24, with its width, measured perpendicularly to the axis O, within a range from half to whole the thickness t of the arc-end-side walls 24. In a particular embodiment, the width of the terminal face 26 equals to or slightly less than the thickness t. The groove 28 have an opening angle θ, or the angle formed between the tangent line to the cylindrical outer surface 18 and the terminal face 26 of the arc-end-side wall, may be equal to or more than 30°, or, in a particular embodiment, is about 55°.

Figure 8:
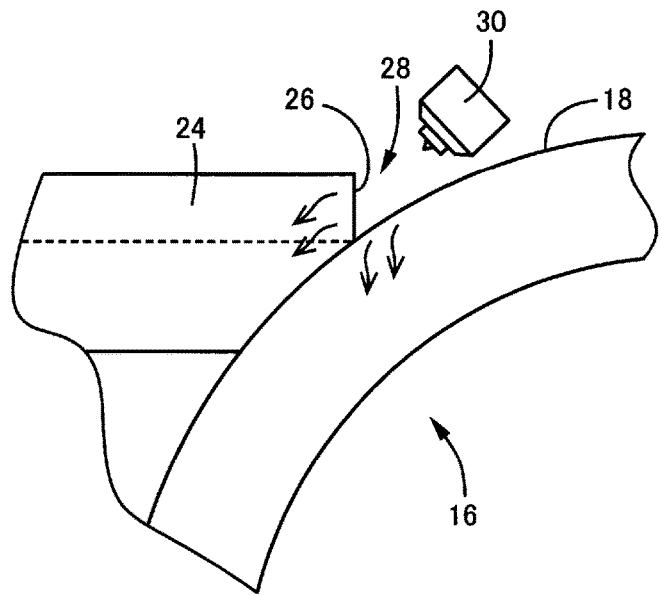
FIG. 8 illustrates the positioning of a welding torch in the process of welding in the groove created by the abutment as shown in FIG. 5.

As shown in FIGS. 5 and 6, the inner peripheral edge 22 of the opening 21 is brought in contact with the cylindrical outer surface 18 along the entire periphery, with the end surface 20 of the circular arc profile of the end 14 of the bushing receiving sleeve 16 butted against the cylindrical outer surface 18. The end surface 20 is then integrally welded to the cylindrical outer surface 18 along its entire periphery including the arc-end-side wall 24 defining the groove 28. When welding the arc-end-side wall 24 that defines the groove 28, the welding torch 30 is directed towards the inside of the groove 28 as shown in FIG. 8 so that the heat may reach the bottom of the groove 28 (i.e. the vertex of the shape of V). The groove 28 thus leads to a well-distributed heat input over the arc-end-side wall 24 and the bushing receiving sleeve 16, and the weld W at the arc-end-side wall 24, which ensures a sufficient penetration depth d and leg L of the weld in the bushing receiving sleeve 16 as shown in FIG. 3, and stably provides a desired bonding strength. The welding process may preferably be conducted by, for example, consumable electrode arc welding method. The penetration depth d of the weld may refer to the maximum depth in the perpendicular direction from the cylindrical outer surface 18 with reference to the original cylindrical outer surface 18 prior to the welding of the bushing receiving sleeve 16, and the leg L of the weld may refer to the length of the line segment between the intersection of an imaginary circle (in the double-dot dash line) at the perpendicular depth of 0.1 mm from the cylindrical outer surface 18 and the weld W.

As described above, in the suspension arm 10 in the described embodiments, the end surface 20 of the end 14, which serves as a tubular joint portion, is curved to have a circular arc profile complementary to the cylindrical outer surface 18 of the bushing receiving sleeve 16. The end surface 20 in its entire periphery is generally in contact with the cylindrical outer surface 18, and welded along its entire periphery to the cylindrical outer surface 18. This allows the bushing receiving sleeve 16 to adequately seal the opening 21 in the end surface 20, thereby assuredly preventing water and/or mud from intrusion into the suspension arm body 12.

Further, a round tube material may be directly used as the bushing receiving sleeve 16. The end surface 20 of the end 14 is only required to have a circular arc profile without any special dimensional accuracy control. In the welding process, the welding torch 30 only needs to trace the cylindrical outer surface 18 of the bushing receiving sleeve 16. The manufacturing cost is thus reduced compared with the case of forming a ridge in the bushing receiving sleeve as described in Patent Publication 1.

In addition, the arc-end-side wall 24 at an arc end of the end surface 20 of the end 14 is in contact with the cylindrical outer surface 18, on the inner peripheral edge 22 of the opening 21. The terminal face 26 of the arc-end-side wall and the cylindrical outer surface 18 of the bushing receiving sleeve 16 defines the V-shaped groove 28, and the welding occurs through the groove 28 so that heat reaches the bottom of the groove 28. This allows for a well-distributed heat input through the groove 28 over the arc-end-side wall 24 and the bushing receiving sleeve 16, leading to a higher bonding strength at its arc-end-side wall 24 due to the larger penetration depth d and leg length L of the weld in the bushing receiving sleeve 16, while ensuring that the opening 21 of the end surface 20 of the end 14 is sealed by the bushing receiving sleeve 16.

In a particular embodiment, the groove 28 has an opening angle θ of 55° so that in the process of welding the heat is easily distributed through the groove 28 over the arc-end-side wall 24 and bushing receiving sleeve 16. Further, the arc-end-side wall 24 includes a terminal face 26 defining a groove 28, and the terminal face 26 extends from the outer edge of the arc-end-side wall 24, with a width of the terminal face 26, as measured in the plane perpendicular to the axis O of the end 14, generally equal to the thickness t of the arc-end-side wall 24. This allows the groove 28 to be large enough to enhance the bonding strength of the joint while ensuring that the opening 21 in the end surface 20 is sealed by the bushing receiving sleeve 16. If the terminal face 26 of the arc-end-side wall is wider than the thickness t, a gap could occur between the opening 21 of the end surface 20 and the cylindrical outer surface 18 of the bushing receiving sleeve 16, leading to a potential of water intrusion depending on the welding condition. On the other hand, if the terminal face 26 of the arc-end-side wall is narrower than half the thickness t, the groove 28 would be smaller, and thus not sufficiently produce the strengthening effect from the improved heat distribution.

Figure 12:
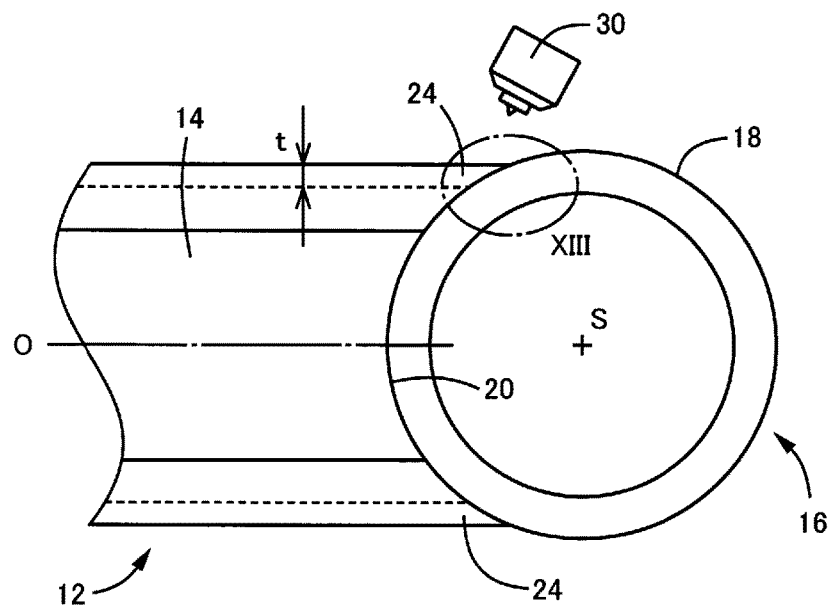
FIG. 12 is a front view, comparable to FIG. 5, of another embodiment, in which the entire end surface of the tubular joint portion is placed in contact with the cylindrical outer surface of the outer casing for the bushing.
Figure 13:
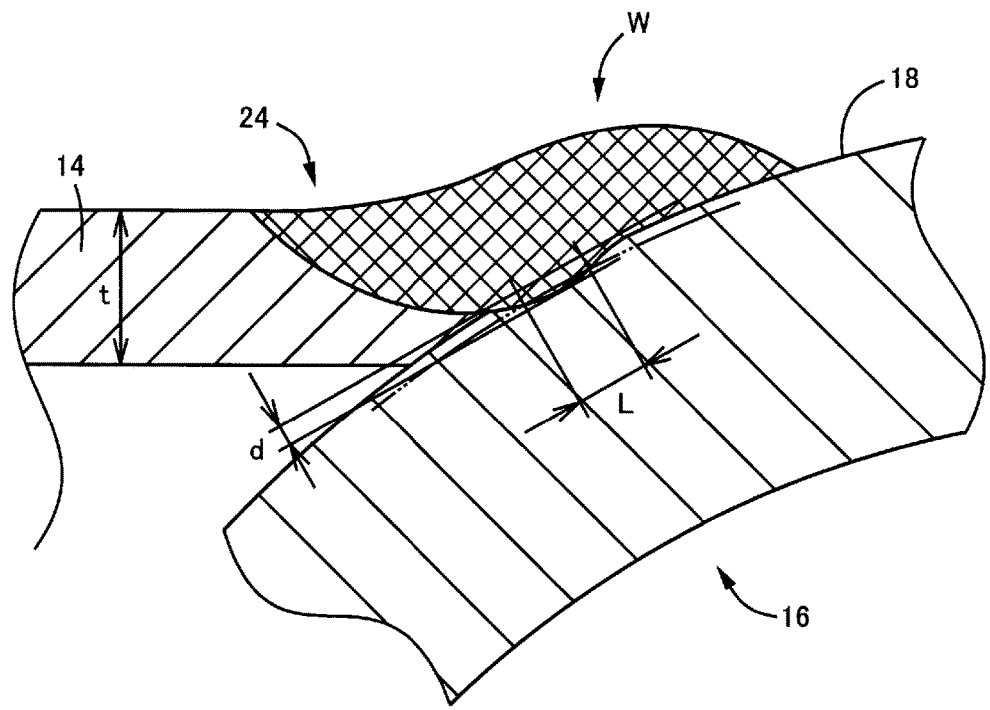
FIG. 13 is an enlarged sectional view of part XIII of FIG. 12, comparable to FIG. 3, illustrating the after welding.

Referring now to FIG. 12, the entire end surface 20 of the arm body end 14, including the arc-end-side wall 24, may define a circular arc profile complementary to the cylindrical outer surface 18 of the bushing receiving sleeve 16, so that the end surface 20 can be in contact with the cylindrical outer surface 18 through a contact area extending over the entire length of the major axis of the obround opening 21, or equivalently, over the entire arc length of the end surface 20. The end surface 20 is then welded along its entire periphery to a cylindrical outer surface 18 using a welding torch 30. In this case, however, the arc-end-side wall 24 at the end surface 20 extends onto the cylindrical outer surface 18 with its thickness t gradually decreasing, and therefore the welding occurs at the outer surface of the arc-end-side wall 24. The heat does not easily reach the bushing receiving sleeve 16, and thus is not well distributed over the two joined members. Accordingly, as readily shown in FIG. 13 that enlarges the cross section of part XIII of FIG. 12 after welding, the weld W might have a relatively small penetration depth d and leg length L in the bushing receiving sleeve 16, and the bonding strength could be partly reduced at the arc-end-side wall 24. For the above reason, the V-shaped groove 28 defined between the terminal face 26 of the arc-end-side wall and cylindrical outer surface 18, as shown in FIGS. 5-8, allows for well-distributed heat input through the groove 28 over the arc-end-side walls 24 and bushing receiving sleeve 16, leading to an enhanced bonding strength of the arc-end-side wall 24 due to the larger penetration depth d and leg length L of the weld W. FIG. 12 mentioned above is a front view comparable to FIG. 5, and FIG. 13 is a sectional view comparable to FIG. 3. The embodiments shown in FIGS. 12 and 13 are also within the first and second aspects of the invention.

Figure 9:
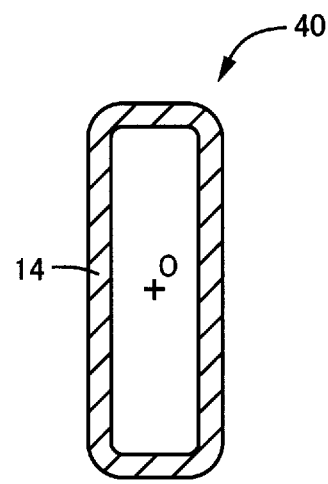
FIG. 9 is a sectional view of another example of a suspension arm body, comparable to FIG. 4.
Figure 10:
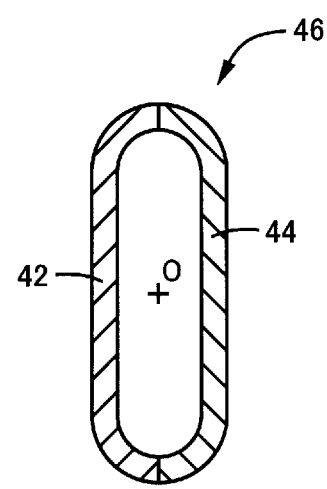
FIG. 10 is a sectional view of a further example of the suspension arm body, comparable to FIG. 4.
Figure 11:
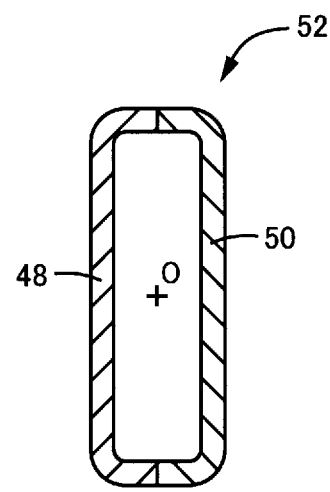
FIG. 11 is a sectional view of a further example of the suspension arm body, comparable to FIG. 4.

While in the embodiments above the suspension arm body 12, including its end 14 which serves as a tubular joint portions, is described as having an obround hollow cross section, another suspension arm body 40 may be used that has a hollow rectangular cross section with straight sides at both ends of its length as shown in FIG. 9. As shown in FIG. 10, a pair of split halves made of steel plates 42, 44 may be abutted and then welded or otherwise joined together to form a suspension arm body 46 having a hollow obround cross section similar to the embodiment described above. Alternatively, as shown in FIG. 11, a pair of split halves made of steel plates 48, 50 may be welded or otherwise joined together to form a suspension arm body 52 having a rectangular hollow cross section similar to that shown in FIG. 9.

While embodiments of the present invention have been described above in detail with reference to the accompanying drawings, such embodiments are merely exemplary. The present invention can be carried out with various modifications and improvements based on the knowledge of those skilled in the art.

LIST OF REFERENCE NUMERALS

10: Suspension arm
12, 40, 46, 52: Suspension arm body
14: End (or tubular joint portion)
16: Bushing receiving sleeve
18: Cylindrical outer surface
20: End Surface
21: Opening
22: Inner peripheral edge
24: Arc-end-side wall
26: Terminal face of the arc-end-side wall
28: Groove
O: Axis
S: Central axis
θ: Opening angle
t: Thickness

The invention claimed is:
1. A suspension arm comprising:
  a suspension arm body having a tubular joint portion defining an opening in an end surface, and
  a bushing receiving sleeve integrally welded to the end surface of the tubular joint portion to seal the opening in the end surface,
  wherein the end surface is curved to have a circular arc profile complementary to a cylindrical outer surface of the bushing receiving sleeve so that in a state of being butted against the cylindrical outer surface the end surface is in contact with the cylindrical outer surface on an entire periphery of an inner peripheral edge of the opening,
  wherein the end surface, in the state of being butted against the cylindrical outer surface on the entire periphery, is welded along the entire periphery to the cylindrical outer surface,
  wherein the tubular joint portion comprises an arc-end-side wall at an end of the circular arc profile of the end surface, the arc-end-side wall being in contact with the cylindrical outer surface at least on the inner peripheral edge of the opening, wherein the arc-end-side wall comprises a terminal face, the terminal face being more spaced from the cylindrical outer surface as it approaches an outer edge of the arc-end-side wall, defining a V-shaped groove between the terminal face and the cylindrical outer surface, and wherein the terminal face of the arc-end-side wall extends from the outer edge of the arc-end-side wall inward to the end of the circular arc profile of the end surface, the terminal face having a width, as measured perpendicularly to the axis of the tubular joint portion, within a range of from (i) half the thickness of the arc-end-side wall to (ii) the full thickness of the arc-end-side wall.

2. A method for producing a suspension arm, comprising:

welding a bushing receiving sleeve integrally to an end surface of a tubular joint portion of a suspension arm body to seal an opening defined in the end surface by the tubular joint portion, wherein the end surface is curved to have a circular arc profile complementary to a cylindrical outer surface of the bushing receiving sleeve so that when butted against the cylindrical outer surface the end surface is in contact with the cylindrical outer surface on an entire periphery of an inner peripheral edge of the opening, wherein the end surface is butted against the cylindrical outer surface on the entire periphery and then welded along the entire periphery to the cylindrical outer surface, wherein the tubular joint portion comprises an arc-end-side wall at an end of the circular arc profile of the end surface, the arc-end-side wall being in contact with the cylindrical outer surface at least on the inner peripheral edge of the opening, wherein the arc-end-side wall comprises a terminal face, the terminal face being more spaced from the cylindrical outer surface as it approaches an outer edge of the arc-end-side wall, defining a V-shaped groove between the terminal face and the cylindrical outer surface, and wherein the terminal face of the arc-end-side wall extends from the outer edge of the arc-end-side wall inward to the end of the circular arc profile of the end surface, the terminal face having a width, as measured perpendicularly to the axis of the tubular joint portion, within a range from (i) half the thickness of the arc-end-side wall to (ii) the full thickness of the arc-end-side wall.

3. The method for producing a suspension arm according to claim 2, wherein the arc-end-side wall defining the groove is welded through the groove so that heat reaches the bottom of the groove.

4. The method for producing a suspension arm according to claim 3, wherein the groove has an opening angle $\theta$ of 30° or more.

* * * * *